(12) United States Patent
Mundell et al.

(10) Patent No.: US 11,547,088 B2
(45) Date of Patent: *Jan. 10, 2023

(54) SYSTEM AND METHOD FOR SELECTING AND EXECUTING TRAINING PROTOCOLS FOR AUTONOMOUSLY TRAINING AN ANIMAL

(71) Applicant: Companion Labs, Inc., San Francisco, CA (US)

(72) Inventors: Paul Mundell, San Francisco, CA (US); John Honchariw, San Francisco, CA (US); Noémie A. Guérin, San Francisco, CA (US); Sayli Benadikar, San Francisco, CA (US); Tim Genske, San Francisco, CA (US)

(73) Assignee: Companion Labs, Inc., San Francisco, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/317,518

(22) Filed: May 11, 2021

(65) Prior Publication Data
US 2021/0289747 A1 Sep. 23, 2021

Related U.S. Application Data

(63) Continuation of application No. 17/146,411, filed on Jan. 11, 2021, now Pat. No. 11,033,002.
(Continued)

(51) Int. Cl.
*A01K 15/02* (2006.01)
*G06F 16/635* (2019.01)
(Continued)

(52) U.S. Cl.
CPC ............ *A01K 15/02* (2013.01); *G06F 16/635* (2019.01); *G06V 20/20* (2022.01); *G06V 40/10* (2022.01); *G06V 40/20* (2022.01)

(58) Field of Classification Search
CPC ...... A01K 15/02; G06F 16/635; G06V 20/20; G06V 40/10; G06V 40/20; G06V 40/23
See application file for complete search history.

(56) References Cited

U.S. PATENT DOCUMENTS 6,273,027 B1 * 8/2001 Watson ................ A01K 15/025
119/712
9,485,963 B2 * 11/2016 Shani ..................... A01K 15/02
(Continued)

*Primary Examiner* — Xuemei G Chen
(74) *Attorney, Agent, or Firm* — Run 8 Patent Group, LLC; Peter Miller; Leah Raddatz

(57) ABSTRACT

One variation of a method for autonomously training an animal includes: loading an autonomous training protocol for the animal onto a training apparatus configured to dispense units of a primary reinforcer responsive to behaviors performed by the animal; during an autonomous training session for the animal, accessing a video feed of a working field near the training apparatus, detecting the animal in the video feed, and executing the first autonomous training protocol; calculating a training score for the autonomous training session based on behaviors performed by the animal during the autonomous training session; selecting a manual training protocol, from a set of manual training protocols, based on the training score; generating a prompt to execute the first manual training protocol with the animal during a first manual training session; and transmitting the prompt to a user associated with the animal.

20 Claims, 4 Drawing Sheets

Related U.S. Application Data

(60) Provisional application No. 62/959,700, filed on Jan. 10, 2020, provisional application No. 62/959,706, filed on Jan. 10, 2020.

(51) Int. Cl.
 *G06V 20/20* (2022.01)
 *G06V 40/10* (2022.01)
 *G06V 40/20* (2022.01)

(56) References Cited

U.S. PATENT DOCUMENTS

| | | | |
|---|---|---|---|
| 9,955,671 B1* | 5/2018 | Turocy | A01K 15/021 |
| 10,080,343 B1* | 9/2018 | Chu | A01K 5/0114 |
| 10,375,930 B1* | 8/2019 | James | A01K 15/02 |
| 2006/0011145 A1* | 1/2006 | Kates | A01K 15/02 119/859 |
| 2006/0011146 A1* | 1/2006 | Kates | A01K 15/021 119/859 |
| 2008/0282988 A1* | 11/2008 | Bloksberg | A01K 15/021 119/51.02 |
| 2009/0044761 A1* | 2/2009 | Chapin | B62D 63/02 701/2 |
| 2009/0145369 A1* | 6/2009 | Lumbroso | A61K 49/0008 119/421 |
| 2010/0176955 A1* | 7/2010 | Jameson | A01K 15/021 340/573.3 |
| 2010/0218733 A1* | 9/2010 | Jordan | A01G 25/16 119/720 |
| 2012/0240863 A1* | 9/2012 | Araujo | A01K 15/02 119/51.01 |
| 2013/0298846 A1* | 11/2013 | Mainini | A01K 15/021 119/719 |
| 2013/0319338 A1* | 12/2013 | Davis | A01K 15/02 119/57.1 |
| 2014/0060452 A1* | 3/2014 | Linssen | A61L 9/14 119/712 |
| 2014/0083364 A1* | 3/2014 | Anderson | A01K 15/02 119/51.01 |
| 2015/0022329 A1* | 1/2015 | Shani | A01K 29/00 340/286.01 |
| 2015/0109439 A1* | 4/2015 | Shani | A01K 15/021 348/143 |
| 2015/0128866 A1* | 5/2015 | Madorin | A01K 5/02 119/51.01 |
| 2016/0086403 A1* | 3/2016 | Litterer | G07C 9/00174 340/5.7 |
| 2016/0125356 A1* | 5/2016 | Kellogg | A01K 11/006 705/332 |
| 2016/0316716 A1* | 11/2016 | Hanson | A01K 5/02 |
| 2017/0035029 A1* | 2/2017 | Mainini | A61B 5/167 |
| 2017/0083018 A1* | 3/2017 | Womble | A01K 27/002 |
| 2017/0099804 A1* | 4/2017 | Chang | A01K 7/06 |
| 2017/0280674 A1* | 10/2017 | Davis | A01K 15/021 |
| 2017/0332602 A1* | 11/2017 | Fenrich | A01K 29/005 |
| 2018/0303065 A1* | 10/2018 | Lee | A01K 15/021 |
| 2019/0174718 A1* | 6/2019 | Venkat | A01K 5/0233 |
| 2019/0213401 A1* | 7/2019 | Kuang | G06Q 50/01 |
| 2019/0357497 A1* | 11/2019 | Honchariw | A01K 15/021 |
| 2019/0380303 A1* | 12/2019 | Davis | A01K 5/025 |
| 2020/0093092 A1* | 3/2020 | Soug | B25J 5/007 |
| 2020/0279428 A1* | 9/2020 | Guay | G06T 13/40 |
| 2021/0153479 A1* | 5/2021 | Mindel | G06V 10/56 |
| 2021/0383114 A1* | 12/2021 | Xu | B25J 19/023 |

* cited by examiner

SYSTEM AND METHOD FOR SELECTING AND EXECUTING TRAINING PROTOCOLS FOR AUTONOMOUSLY TRAINING AN ANIMAL

CROSS-REFERENCE TO RELATED APPLICATIONS

This Application is a continuation of U.S. patent application Ser. No. 17/146,411, filed on 11 Jan. 2021, which claims the benefit of U.S. Provisional Application No. 62/959,700, filed on 10 Jan. 2020, and U.S. Provisional Application No. 62/959,706, filed on 10 Jan. 2020, each of which is incorporated in its entirety by this reference.

TECHNICAL FIELD

This invention relates generally to the field of animal training and more specifically to a new and useful method for autonomously selecting and executing training protocols for shaping behavior of an animal in the field of animal training.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

Figure 1:
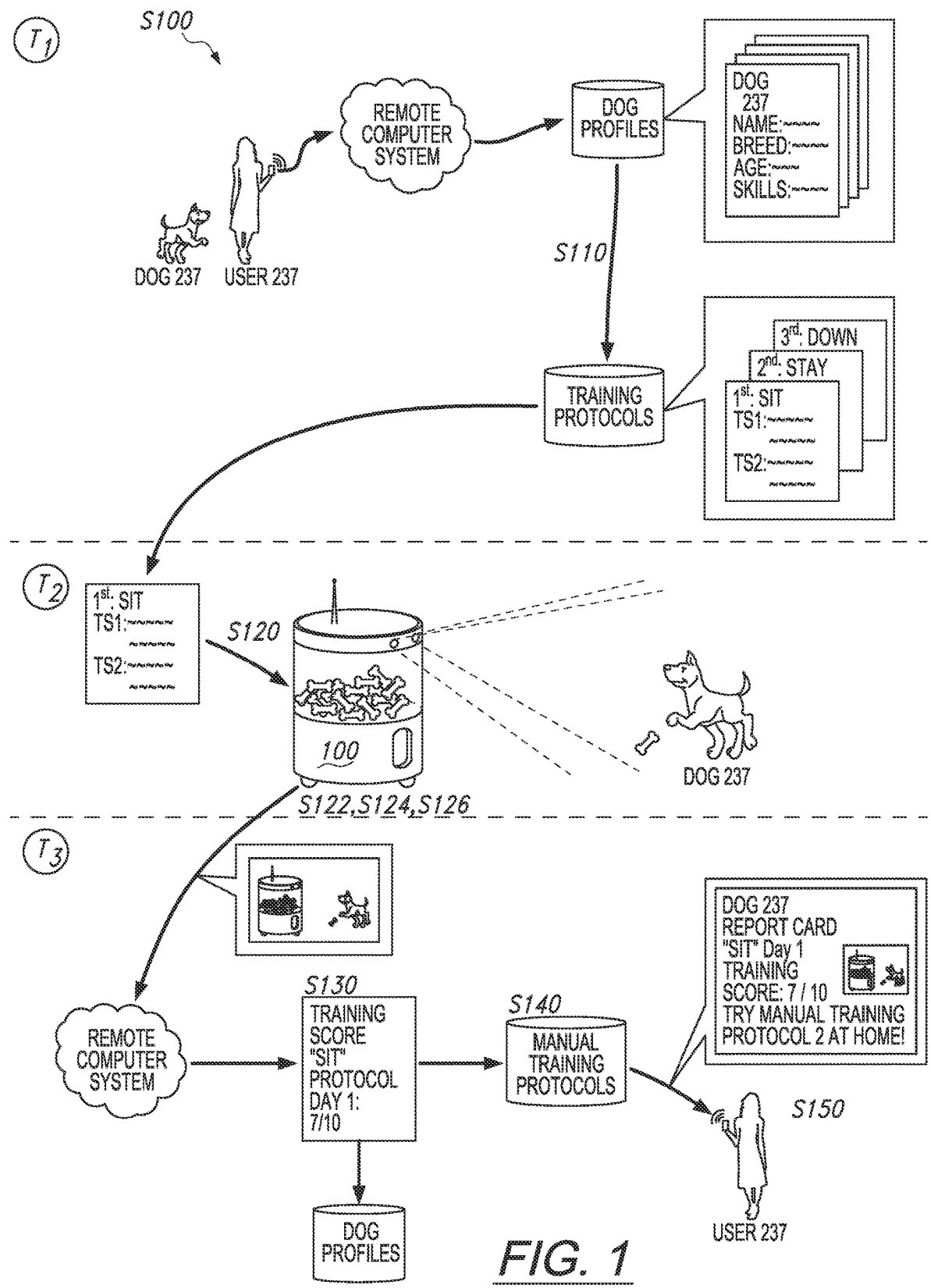
FIG. 1 is a flowchart representation of a method.
Figure 2:
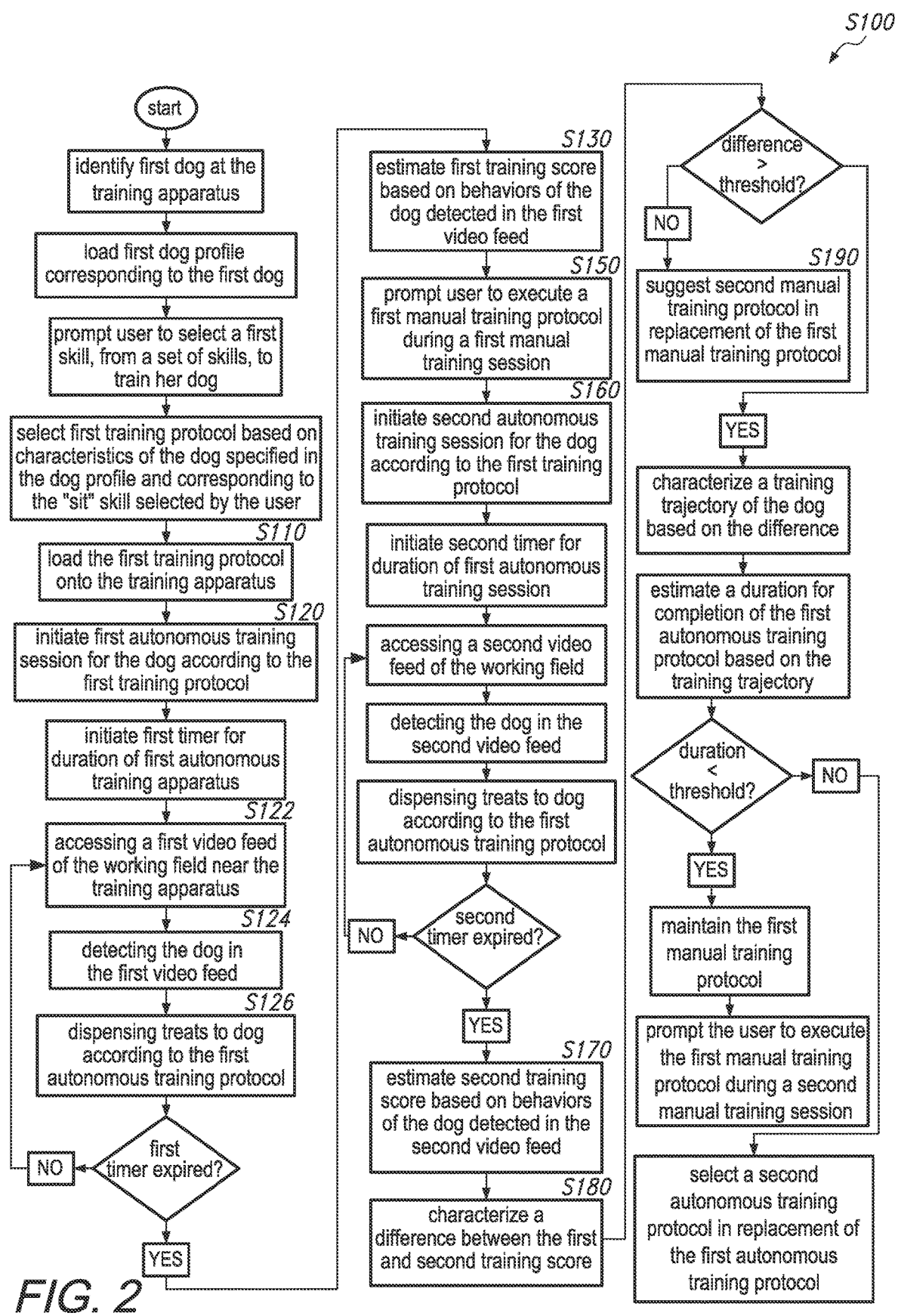
FIG. 2 is a flowchart representation of the method.
Figure 3:
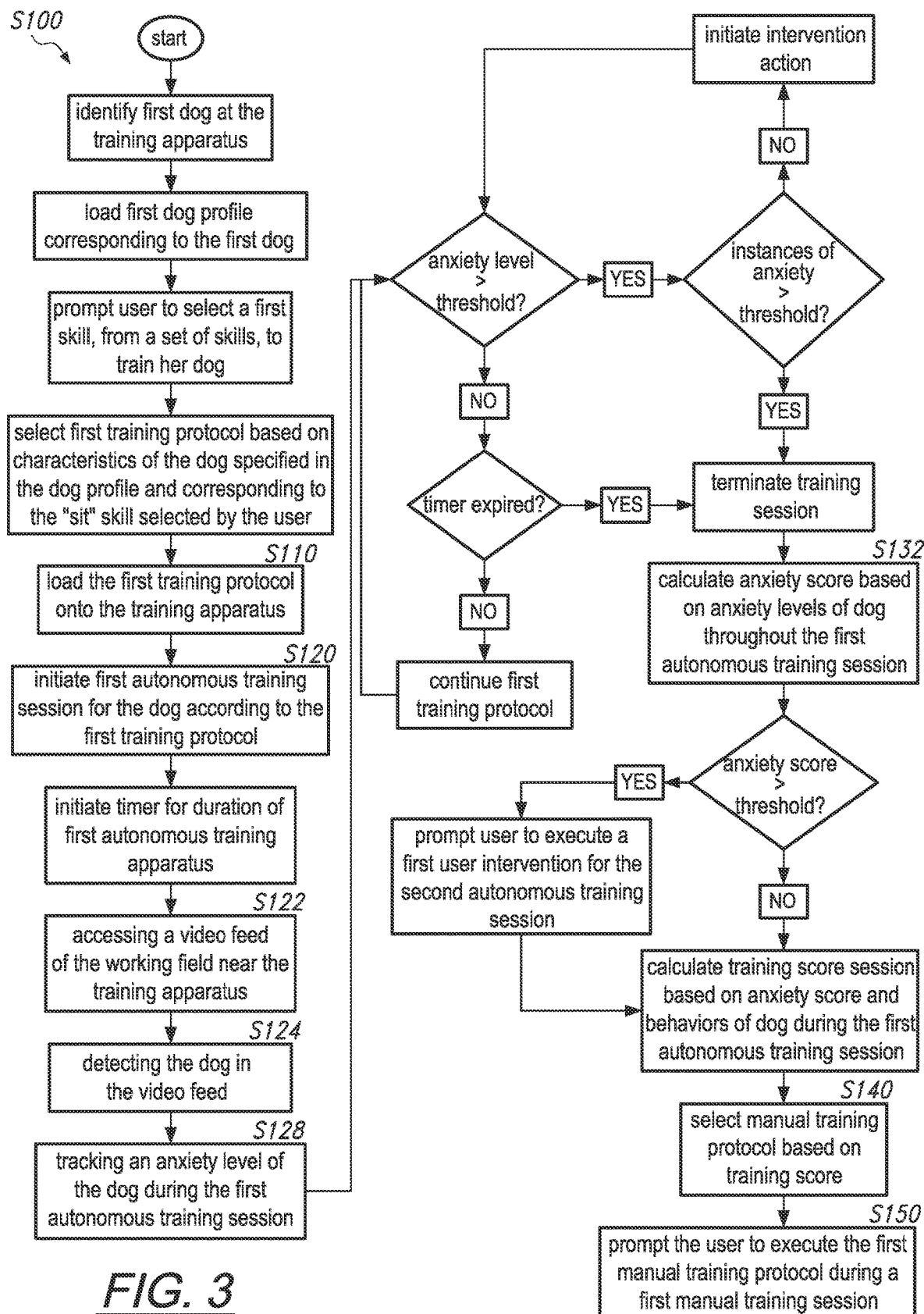
FIG. 3 is a flowchart representation of the method.

As shown in FIGS. 1-3, a method S100 for autonomously training an animal includes, during an initial period, in response to identifying the animal, loading a first autonomous training protocol for the animal onto a training apparatus 100 configured to dispense units of a primary reinforcer responsive to behaviors performed by the animal in Block S110. The method S100 further includes, during a first autonomous training session for the animal succeeding the initial period: accessing a first video feed of a working field near the training apparatus 100 in Block S122; detecting the animal in the first video feed in Block S124; and triggering dispensation of units of a primary reinforcer responsive to behaviors performed by the animal according to the first autonomous training protocol in Block S126. The method S100 further includes: during a first interim period succeeding the first autonomous training session: calculating a first training score for the first autonomous training session based on behaviors performed by the animal during the first autonomous training session in Block S130; selecting a first manual training protocol, from a set of manual training protocols, based on the first training score in Block S140; and generating a prompt to execute the first manual training protocol with the animal during a first manual training session prior to a next autonomous training session for the animal and transmitting the prompt to a user associated with the animal in Block S150.

As shown in FIG. 2, one variation of the method S100 includes: during an initial period, loading a first autonomous training protocol for an animal onto a training apparatus 100 configured to dispense units of a primary reinforcer responsive to behaviors performed by the animal in Block S110; and, during a first autonomous training session with an animal, executing the first autonomous training protocol at the training apparatus 100 in Block S120; and, during a first interim period succeeding the first autonomous training session, estimating a first training score for the first autonomous training session based on behaviors performed by the animal during the first autonomous training session in Block S130 and prompting a user associated with the animal to execute a first manual training protocol, from a set of manual training protocols, during a first manual training session in Block S150. In this variation, the method S100 further includes, during a second autonomous training session succeeding the first manual training session, executing the first autonomous training protocol in Block S160. The method S100 further includes, during a second interim period succeeding the second autonomous training session: estimating a second training score for the second autonomous training session based on behaviors performed by the animal during the second autonomous training session in Block S170; characterizing a training progression of the animal for the first autonomous training protocol based on the first training score and the second training score in Block S180; and amending the first manual training protocol based on the training progression in Block S190.

As shown in FIG. 3, one variation of the method S100 includes, during a first autonomous training session with an animal: accessing a video feed of a working field near a training apparatus 100 configured to dispense units of a primary reinforcer based on behaviors performed by the animal responsive to commands output by the training apparatus 100 in Block S122; detecting the animal in the video feed in Block S124; and tracking an anxiety level of the animal based on the video feed in Block S128. In this variation, the method S100 further includes, during a first interim period succeeding the first autonomous training session: estimating a first anxiety score of the animal based on the anxiety level of the animal during the first autonomous training session in Block S132; based on the first anxiety score, selecting a first manual training protocol, from a set of manual training protocols, configured to reduce anxiety of the animal during training sessions in Block S140; and generating a prompt to execute the first manual training protocol with the animal during a first manual training session preceding a next autonomous training session and transmitting the prompt to a user associated with the animal in Block S150.

2. APPLICATIONS

Generally, Blocks of the method S100 can be executed by a computer system (e.g., a computer network, a remote computer system, a local or remote server) and/or by a local training apparatus 100: to select autonomous training protocols—executable by the training apparatus 100—for autonomously training a dog to respond to commands (e.g., visible and/or audible commands); to autonomously execute these training protocols with the dog, including outputting these commands, tracking the dog's responses to these commands, and rewarding the dog with edible reinforcers and/or audio praise responsive to alignment between the dog's responses and corresponding commands; and to score the dog's proficiency for responding to these commands and/or score the dog's anxiety based on the dog's actions during execution of these training protocols. The computer system and/or the local training apparatus 100 can then schedule or suggest additional manual training protocols to a user (e.g., the dog's owner, a dog trainer) for interacting with and manually training the dog based on these dog's training score and/or anxiety score.

More specifically, the local training apparatus 100 can execute an autonomous training protocol to autonomously train a dog to respond to a particular command (e.g., "sit," "stay," "lie down"), including outputting audible and/or visual commands, tracking the dog in a video feed, and rewarding the dog with a primary reinforcer (e.g., a "treat") when the dog's actions align with these commands. During execution of the autonomous training protocol, the training apparatus 100 and/or the computer system can: monitor the dog's proficiency for these commands, such as based on speed and proximity of the dog's poses to target poses associated with these commands; monitor the dog's anxiety, such as based on skittishness or episodes of panting by the dog; and score the dog accordingly. If the dog and training apparatus 100 are present in an animal facility (e.g., a boarding facility, an animal shelter, an animal training facility) remove from the owner, the computer system can: output guidance to a trainer or associate of the animal facility to adjust management of the dog based on the dog's anxiety score (e.g., scheduling training protocols with the training apparatus 100 proportional to anxiety exhibited by the dog, identifying and supporting an overly-anxious dog in the facility); return the dog's anxiety score and training score to the dog's owner—such as with images of the dog captured during execution of the autonomous training protocol—to keep the owner apprised of her dog's comfort and training while the dog is boarded; and prompt the owner to perform additional manual training with the dog outside of the boarding facility—such as in a quiet place at home, in a backyard, or in a public place—at a later time based on the dog's training score. If the dog and the training apparatus 100 are present in the owner's home, the training apparatus 100 and the computer system can similarly interface with the dog and with the owner to autonomously train and monitor the dog while the owner is away from home and to guide in-person interactions and manual training between the owner and the dog based on the dog's training scores for various training protocols.

Over time, the computer system can track progress of the dog over multiple training sessions to inform selection of autonomous and manual training protocols for the dog and/or to inform the user of the dog's training progress. The computer system can store training data (e.g., training scores, anxiety scores, training protocols) in a dog profile associated with the dog and leverage this training data to tailor training protocols (e.g., autonomous and manual) matched to this particular dog. From this training data, the computer system can learn to identify symptoms of anxiety, boredom, disengagement, and/or engagement for this particular dog and leverage this information to modify training protocols in (near) real time and/or before a next training session to better focus the dog during these training sessions. Further, the computer system can suggest to the user various intervention techniques for improving both autonomous training sessions and manual training sessions for her dog based on the training data.

Generally, the computer system can interface with a training apparatus 100 including: a depth camera or other optical sensor configured to detect poses and/or motion of the dog; a microphone or other audio sensor; a reservoir configured to store units of a primary reinforcer (e.g., treats); a dispenser configured to eject units of primary reinforcer into a field nearby; a speaker configured to output an audible conditioned reinforcer; and a processor configured to implement computer vision and/or artificial intelligence techniques to interpret positions and poses of the dog within the field from images recorded by the optical sensors.

The method is described herein as executed by the training apparatus 100 and/or the computer system to train a dog and guide interactions between the dog and the dog's owner or other care provider. However, the method can be executed by the training apparatus 100 and/or the computer system in conjunction with any other type of animal, such as a cat, horse, or bird.

3. EXAMPLE

In one example, to onboard a dog, the computer system or the training apparatus 100 can interface with a user (e.g., the dog's owner or trainer, an associate of a boarding facility) through a native application or web browser executed on a computing device (e.g., a smartphone, a tablet) to generate a dog profile for the dog. In order to verify that the user's dog is comfortable with the training apparatus 100 and prepared for autonomous training with the training apparatus 100, the computer system can: initiate an acclimation session; prompt the user to remain with the dog during the acclimation session; record a video feed through the camera (and an audio feed via the microphone); track and monitor the dog and/or user in this video feed; dispense treats (e.g., an "unconditioned reinforcer") in quick succession into the working field for the dog; and characterize the dog's response to these treats during this acclimation session based on the video and audio feeds. The computer system can calculate an acclimation score for the dog and store this score to the dog profile. The computer system can also notify the user (e.g., dog owner) of the acclimation score.

Once the dog has completed the acclimation session(s), the computer system can select a first autonomous training protocol for the dog. For example, the computer system can select a first autonomous training protocol for a first autonomous training session with the dog based on: a particular skill (e.g., "sit") specified by the user; characteristics of the dog (e.g., age, breed, size, reproductive status); and/or the dog's acclimation score.

Upon selection of a first autonomous training protocol configured to train a "sit" command, the training apparatus 100 can: initiate a first autonomous training session with the dog; output a tone or oral command for "sit" defined in the first autonomous training protocol through a speaker in the training apparatus 100; and dispense units of primary reinforcer (e.g., individual "treat" units) in response to a pose of the dog—detected in a color, depth, or infrared video feed captured by the training apparatus 100—matching a "sit" position (or falling within a range of sit positions) defined in the first autonomous training protocol. Furthermore, the training apparatus 100 (or the computer system) can: calculate a first training score for the first autonomous training session based on how quickly and how closely the dog entered the target pose specified by the autonomous training protocol following output of an audible or visual "sit" command; calculate an anxiety score for the dog based on the dog's performance and detectable characteristics (e.g., body posture, tail posture, panting, repetitive behaviors); store these scores in the dog's profile; and report these scores to the dog owner.

Upon completion of the first autonomous training session, the computer system (or the training apparatus 100) can notify the user of the dog's progression through an autonomous training protocol and selectively prompt the user to manually engage with the dog, such as to further reinforce skills developed during a recent training session with the training apparatus 100 and/or to address the dog's anxiety. In this example, the computer system can generate a notification containing the first training score and a suggestion for an "at home" manual training protocol, such as including a suggestion for an environment in which the dog is likely to succeed during this manual training protocol (e.g., a quiet room in the dog's home if the training score is low and/or if the anxiety score is high; a public dog park if the training score is high and/or if the anxiety score is low). The computer system can then send the notification to the user (e.g., to the dog's owner when the owner picks up the dog from the boarding facility).

Therefore, the computer system can leverage data from training sessions executed autonomously by the training apparatus 100 to aid the user in manually maintaining and reinforcing her dog's training on her own. Thus, the computer system and the training apparatus 100 can execute Blocks of the method to both: communicate with the user regarding training session performance and her dog's anxiety levels during training, thereby keeping the user updated regarding her dog's training and anxiety levels; and support the user through manual training of her dog on her own by providing suggested manual training protocols to the user based on the dog's interactions with the training apparatus 100 during autonomous training sessions.

4. TRAINING APPARATUS

Figure 4:
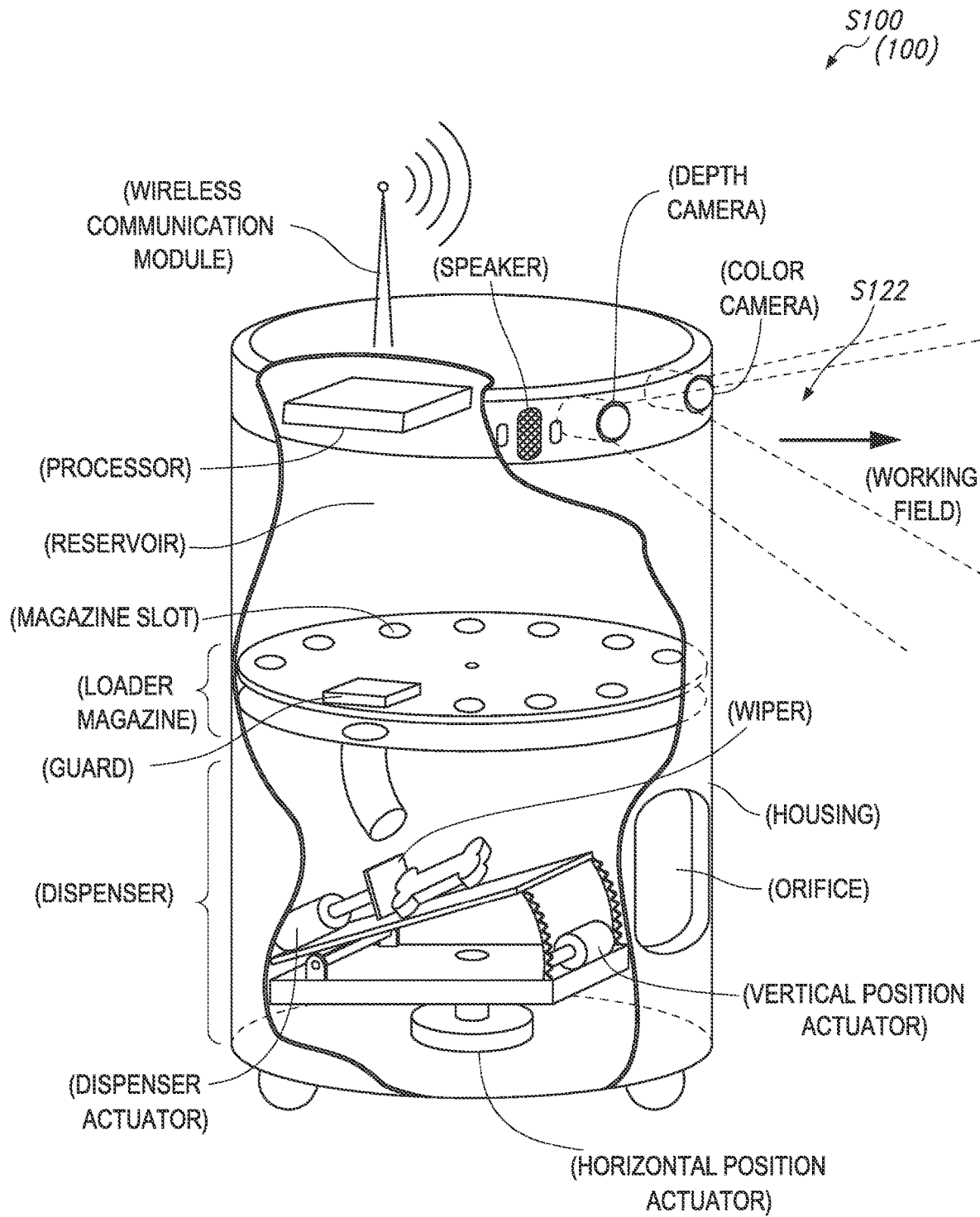
FIG. 4 is a schematic representation of the method.

As shown in FIG. 4, the training apparatus 100 can include: a suite of optical sensors configured to record images (e.g., color and/or depth images) of a working field ahead of the training apparatus 100; audio sensors configured to record ambient noise and dog vocalizations within the working field around the system; a speaker configured to output audible cues; a wireless communication module configured to download data and/or a dog model from a remote database or local computing device; a treat reservoir configured to store units of a treat, such as loose treats or treats in a magazine; a dispenser configured to eject treats into the working field; a loader configured to load individual treat units from the reservoir into the dispenser; a processor configured to interpret positions and poses of a dog in the working field in (near) real-time from images recorded by the suite of optical sensors, to move the dispenser into axial alignment with the dog as the dog moves through the working field, and to selectively trigger the dispenser to eject a treat unit toward or near the dog; and a housing containing these elements.

In one implementation, the training apparatus 100 includes: a color camera configured to output 2D color images (hereinafter "color images"); and a depth camera configured to output 3D depth maps or point clouds (hereinafter "depth images"). In this implementation, the color and depth camera can be arranged in fixed positions on the housing and can define fields of view directed outwardly from the housing to define the working field in which the training apparatus 100 identifies, tracks, and selectively rewards an animal.

The wireless communication module can include a wireless transceiver configured to connect to an external device and to retrieve various data from this device. For example, the system can connect to a user's smartphone or tablet—executing a native dog training application—to access: dog characteristics or descriptors input by the user; oral commands spoken by the user and recorded by the user's device; and/or training protocol preferences or selections entered by the user at the device. The wireless communication module can also download a generic dog model from a remote database. Alternatively, the wireless communication module can download a particular dog model—from a set of available dog models—more tailored to detecting and identifying a particular dog designated for training by the system, such as based on a species, breed, age, size, or markings of the dog input by the user into the native dog application executing on her smartphone or tablet.

Furthermore, the wireless communication module can upload color and/or depth images recorded by the training apparatus 100 to a remote server in order to expand a training set of images of dogs available to the remote server; the remote server can then retrain a dog model based on these additional data and redeploy the dog model to the training apparatus 100 (and to other instances of the training apparatus 100) to improve detection of a dog and identification of poses of the dog.

In one variation, the training apparatus 100 can be configured to wirelessly communicate (e.g., via the wireless communication module) with a set of secondary devices proximal (e.g., within a user's home) to the training apparatus 100. For example, the training apparatus 100 can be configured to communicate with a stereo to produce background noise during a training session with the dog, such as to distract the dog from various background noises (e.g., a different dog barking in another room, the dog's owner speaking on her phone nearby) detected in the audio feed. In another example, the training apparatus 100 can be configured to wirelessly communicate with a robotic vacuum owned by the user to clean the working field after completion of an autonomous training session for the dog. Additionally and/or alternatively, the training apparatus 100 can be configured to trigger activation of the robotic vacuum upon detecting absence of the dog from the working field for a threshold duration. Therefore, in this example, the training apparatus 100 can both enable cleaning of the working field to remove scents and/or physical units of primary reinforcer after an autonomous training session while limiting exposure of the dog to the robotic vacuum during and/or immediately after the autonomous training session, in order to discourage the dog from associating the training apparatus 100 with the robotic vacuum.

5. ONBOARDING

The training apparatus 100 can host or interface with a user portal (e.g., via native application or web application)—executing on a user's computing device (e.g., a smartphone, a tablet)—to configure a series of training protocols for a new animal. For example, once the system is received by the user (e.g., trainer at a dog boarding facility, dog owner), the user can download the native application to her smartphone and connect her smartphone to the system, such as by: wirelessly pairing her smartphone to the system; scanning a QR code arranged on the system to register the system to her smartphone; or by manually entering into the native application a unique code arranged on the system or product packaging.

Once the system is registered and connected to the user's smartphone, the user can create a new profile for the dog within the native application and manually populate the new profile with various information, such as: a name; age; breed; size; and/or primary colors of the dog's coat (e.g., black for a black Labrador or reddish-brown for a redbone coonhound). This new profile can be stored in a remote database, and the native application can upload these data to the new profile via the Internet. Alternatively, the system can extract or derive these dog characteristics directly from a video feed recorded during a first acclimation session with the dog and then populate the profile for the dog with these characteristics accordingly.

In one variation, upon purchase of a new training apparatus 100 by a user and before delivery of the training apparatus 100 to the user, the computer system can automatically generate a new dog profile for a user's dog. For example, upon purchase of a new training apparatus 100, the computer system can: prompt the user—via a web portal accessed by the user at the user's mobile phone—to provide an email address for setting up a new profile; and automatically generate a new profile for the user and her dog linked to this email address. In this example, the computer system can automatically link this new dog profile to the training apparatus 100 shipped to the user. Once the training apparatus 100 is delivered to the user, the user may download the native application to her smartphone and log in to the new dog profile (e.g., via her email address linked to the new profile) created for her dog. Upon logging into the new dog profile, the training apparatus 100 can: automatically wirelessly pair her smartphone to the training apparatus 100. The computer system can then: prompt the user to specify a set of characteristics (e.g., breed, age, sex, weight, activity level, name) of the user's dog; and populate the new dog profile for the user and her dog based on the set of characteristics input by the user.

Once a dog profile is created, the computer system can access the dog profile before an acclimation session and/or training session. The computer system can identify a first dog in a field of the training apparatus 100 and access a first dog profile associated with the first dog. For example, the computer system can prompt a user to scan an RFID tag located on a collar of the first dog. In response to the RFID tag corresponding to the first dog, the computer system can access the first dog profile. In another example, the computer system can prompt the user to input a unique identifier (e.g., within the native application) corresponding to the first dog. Upon recognizing the unique identifier, the computer system can access the first dog profile. Alternatively, the computer system can receive images of the first dog recorded by the training apparatus 100 and extract characteristics of the first dog from these images. Based on these extracted characteristics, the computer system can identify the first dog and access the first dog profile.

The computer system can store data recorded during acclimation sessions and training sessions with the dog in the dog profile. For example, at a first time, the computer system can select a first autonomous training protocol (e.g., "TP 1.0") for a dog, the first autonomous training protocol including a first module (e.g., "TP 1.1"), a second module (e.g., "TP 1.2"), and third module (e.g., "TP 1.3"). Then, the computer system can initiate a first autonomous training session according to the first autonomous training protocol, and initiate the first training module (e.g., "TP 1.1"). Upon termination of the first autonomous training session after completion of the first and second module and before completion of the third module, the computer system can indicate completion of the first and second module of the first autonomous training protocol in the dog profile. Later, in response to identifying the dog (e.g., via a unique identifier input by the user) at the training apparatus 100, the computer system can access the dog profile associated with the dog and access the autonomous training protocol selected for the dog. In response to the dog profile specifying that the dog completed the first module (e.g., "TP 1.1") and the second module (e.g., "TP 1.2") of the first autonomous training protocol, the computer system can automatically select the third module for loading onto the training apparatus 100 for a second training session with the dog. The training apparatus 100 can then initiate the second training session by initiating the third module (e.g., "TP 1.3"). Therefore, the computer system can store both dog characteristics and dog training information in the dog profile and access this information as needed, thus simplifying tracking of dog characteristics and the dog's training over time.

5.1 Acclimation

Upon generation of a dog profile for a dog, the training apparatus 100 can initiate an acclimation session to verify that the user's dog is comfortable with the training apparatus 100 and prepared for autonomous training with the training apparatus 100.

For example, the training apparatus 100 can: initiate a first acclimation session; record a video feed through the camera (and an audio feed via the microphone); track and monitor the dog in this video feed; dispense treats (e.g., an "unconditioned reinforcer") in quick succession into the working field for the dog; and characterize the dog's response to these treats during a first period of this acclimation session based on the video and audio feeds. If the dog exhibits shyness, flinches, retreats from the system, vocalizes, or otherwise exhibits discomfort during this first period, the training apparatus 100 can repeat this first period but under different parameters that may yield less discomfort for the dog, such as: dispensing treats further away from the dog and/or at lower velocity to reduce perception of these treats as invasive; dispensing treats more slowly and/or at lower velocity in order to reduce machine noise generated by the system; or dispensing treats with the user closer to the dog.

The computer system can generate an acclimation report indicative of the dog's responses and performance during the acclimation session. For example, the computer system can: generate an acclimation report including an acclimation score representative of the dog's level of comfort with the training apparatus 100; store this acclimation report and the acclimation score to the dog profile; and share (e.g., via the native application) the report with the dog's owner and/or trainer.

6. FIRST AUTONOMOUS TRAINING SESSION

Once the dog is acclimated to the training apparatus 100 (e.g., via execution of a set of acclimation sessions), the computer system can initiate a first autonomous training session with the dog.

In one implementation, the computer system can initiate the first autonomous training session for the dog responsive to detection of the dog at the training apparatus 100 (e.g., in the working field of the training apparatus 100). For example, the computer system can: detect a dog in the working field of the training apparatus 100; access an image of the dog in the working field recorded by the training apparatus 100; extract a set of characteristics of the dog from the image; access a set of dog profiles in a remote database; and, in response to the set of characteristics matching a first dog profile, in the set of the dog profiles, identify the dog according to the first dog profile. Alternatively, in another implementation, the computer system can prompt the user with her dog to provide an identification of the dog. For example, the computer system can prompt the user to scan a barcode on the dog's collar at the training apparatus 100. In response to receiving the scanned barcode, the computer system can: access the set of dog profiles in the remote database; and, in response to the barcode matching the first dog profile, in the set of the dog profiles, identify the dog according to the first dog profile.

In one implementation, the computer system can select a first autonomous training protocol, from a set of training protocols, for the first autonomous training session for the dog based on information stored in the dog profile. In particular, the computer system can: access the dog profile to access a set of characteristics of the dog (e.g., age, breed, size, reproductive status, activity level) stored in the dog profile; and select the first autonomous training protocol, from the set of training protocols, based on the set of characteristics. For example, the computer system can: access a dog profile of a dog; and, in response to the dog profile specifying a young, energetic dog, select a first autonomous training protocol defining a first duration of autonomous training sessions. Alternatively, in response to the dog profile specifying an older, lower-energy dog, the computer system can select a second autonomous training protocol defining a second difficulty level defining a second duration of autonomous training sessions, the second duration less than the first duration.

Additionally and/or alternatively, the computer system can: access the dog profile to access an acclimation score of the dog representative of the dog's level of comfort with the training apparatus 100 during a set of acclimation sessions preceding the first autonomous training session; and select the first autonomous training protocol, from the set of training protocols, based on the acclimation score and/or the set of characteristics. For example, in response to the acclimation score for the dog exceeding a threshold acclimation score, the computer system can select a first autonomous training protocol configured to train the dog a particular skill. Alternatively, in response to the acclimation score for the dog falling below the threshold acclimation score, the computer system can select a second autonomous training protocol configured to both introduce the dog to a particular skill while increase a comfort level of the dog with the training apparatus.

In another implementation, the computer system can select a first autonomous training protocol for a first autonomous training session with the dog based on user preference. For example, the computer system can prompt the user to select a particular skill (e.g., "sit," "stay," "lie down," "no barking"), from a set of skills, that the user wishes her dog to learn. Based on the particular skill selected by the user, the computer system can select a particular autonomous training protocol corresponding to the particular skill. In this example, in response to the user selecting the "sit" command, the computer system can select a first autonomous training protocol configured for training the "sit" command.

Additionally, in another implementation, the computer system can select the first autonomous training protocol for the first autonomous training session with the dog based on both user preference and information stored in the dog profile. For example, the computer system can: prompt the user to select a particular skill, form a set of skills; and, in response to the user selecting the "sit" skill, isolate a first subset of training protocols, from a set of training protocols, corresponding to the "sit" skill. Then, the computer system can: access the dog profile to access a set of characteristics (e.g., age, breed, size) of the dog and an acclimation score for a set of acclimation sessions preceding the first autonomous training session for the dog; and select a first training protocol, from the first subset of training protocols, based on the set of characteristics and the acclimation score.

Alternatively, in yet another implementation, the computer system can select a generic training protocol for the first autonomous training session for the dog.

The computer system can load the first training protocol onto the training apparatus 100 in preparation for the first autonomous training session. The computer system can then initiate the first autonomous training session for the dog (e.g., when the dog is present in the working field and/or prepared for the first autonomous training session). During the first autonomous training session, the training apparatus 100—in combination with the computer system—can: access a video and/or audio feed of the working field near the training apparatus 100; detect the dog in the video feed; and dispense units of the primary reinforcer (e.g., dog treats) into the working field, responsive to behaviors performed by the dog, according to the first autonomous training protocol. The training apparatus 100 can dispense treats within the working field responsive to behaviors performed by the dog as detected in the video and/or audio feed in order to reinforce these behaviors.

7. TRAINING SESSION METRICS

After an autonomous training session to teach the dog a new skill (e.g., to "sit" on command), the computer system can: calculate a training score for the dog; record the training score to the dog profile; and/or notify the user(s) (e.g., dog owner, dog trainer, employee at a dog boarding facility) of the training score (e.g., via the native application operating on the user's mobile device).

In one variation, the computer system calculates a training score based on repetitions of a particular skill executed by the dog. For example, at a first time, the training apparatus 100 can initiate a first autonomous training session with a dog, the first autonomous training session following an autonomous training protocol for teaching the dog a "sit" command. During the first autonomous training session, the computer system can output the "sit" command (pseudo) randomly; dispense primary reinforcer units in response to the dog entering the "sit" pose upon this command; record a number of successes (e.g., a number of times the dog enters the "sit" pose in response to the "sit" command) for the dog during the first autonomous training session; and record a number of attempts (e.g., a number of the times the computer system output the "sit" command) for the dog during the first autonomous training session. Then, upon completion of the first autonomous training session, the computer system can calculate a first training score for the dog (e.g., "30/50" or "60%" or "satisfactory") for the first autonomous training session based on the number of successes (e.g., "30 sits") and the number of attempts (e.g., "50 sits").

In particular, in the preceding example, for each instance of the "sit" command output by the training apparatus, the computer system can calculate the first training score based on a set of behaviors of the dog responsive to each "sit" command output by the training apparatus. For example, the computer system can calculate the first training scored based on: accuracy of "sit" poses executed by the dog responsive to the "sit" command; durations between the training apparatus outputting the "sit" command and detecting the dog in the "sit" pose; and/or dog vocalizations detected in an audio feed captured at the training apparatus.

For example, the computer system can access a target "sit" pose for the dog. Then, for each "sit" command output by the training apparatus, the computer system can: extract a current pose of the dog responsive to the "sit" command; and characterize a deviation between the current pose and the target "sit" pose. The computer system can then calculate a pose score for the autonomous training session based on the deviation calculated for each instance of the "sit" command. Additionally and/or alternatively, for each "sit" command output by the training apparatus, the computer system can: record a first time at which the "sit" command is output by the training apparatus; record a second time at which the dog enters the "sit" pose; and calculate a duration between the first time and the second time. The computer system can then calculate a time score for the autonomous training session based on the duration calculated for each instance of the "sit" command. Additionally and/or alternatively, for each "sit" command output by the training apparatus, the computer system can: access an audio feed captured at the training apparatus; extract a set of vocalization characteristics (e.g., a type of vocalization, a frequency, a volume) from the audio feed; and characterize a vocalization level based on the set of vocalization characteristics. The computer system can then calculate an audio score for the autonomous training session based on the vocalization level at each instance of the "sit" command. Finally, the computer system can calculate the first training score for the first autonomous training session based on the pose score, the time score, and the audio score.

In one variation, the computer system can calculate a rank for the dog based on the performances of other dogs. For example, for a first dog interacting with the training apparatus 100 at a dog boarding facility, the computer system can: calculate an average duration between when a "sit" command is output and when the dog enters the "sit" pose over an autonomous training session. The computer system can then: store the average duration in a dog profile associated with the dog; access a set of dog profiles representing other dogs and their interactions with the training apparatus 100; extract from the set of dog profiles the average duration for each dog; order the dogs based on the average duration associated with each dog; and assign a rank to the dog based on a position of the dog in the order. The computer system can store this rank in the dog profile and/or notify a user of the rank.

In one variation, the computer system calculates an overall training score for the dog based on the dog's performance of a skill (ability to enter the "sit" pose on command) over multiple training sessions. For example, the computer system and/or training apparatus 100 can: prompt a user to input an ID code corresponding to a dog; access a dog profile corresponding to the ID code and the dog; load an autonomous training protocol for teaching the "sit" command based on a first training score corresponding to a first autonomous training session as specified in the dog profile; initiate a second training session to continue teaching the "sit" command; calculate a second training score for the second training session and store this second training score in the dog profile; and calculate an overall training score based on a combination of the first training score and the second training score. In this example, in response to the dog profile specifying the first training score of "10 out of 20" and/or "50% success" and the second training score of "15 out of 20" and/or "75% success", the computer system can calculate an overall training score of "25 out of 40" and/or "62.5% success" and store this overall training score to the dog profile.

The computer system can calculate a training score for a particular skill (e.g., "sit") and/or representative of all skills trained to the dog (e.g., "sit", "stay", "heel", "no bark").

The computer system can generate a training report on a regular schedule (e.g., once per training session, once per day; once per week) based on these scores and training progression of the dog. For example, the computer system can generate a weekly training report including: each training score for each autonomous training session completed during a first week; and a training progression for the first week including a difference between a first score for a first autonomous training session for the first week and a last score for a last autonomous training session for the first week. The computer system can then send the training report to the user(s) (e.g., dog owner and/or boarding facility employee) and store the training report at the dog profile. Additionally and/or alternatively, the computer system can send notifications (e.g., via text message) to the user(s) upon completion of training milestones by the dog. For example, the computer system can send a message to the user that reads: "Congratulations! Your dog has successfully completed the "sit" training protocol and has now mastered the "sit" command." Therefore, the computer system can autonomously tabulate results of training to keep the user informed of her dog's performance.

7.1 Training Highlights

In one variation, the training apparatus 100 can: record video clips (e.g., 5-second video clips, 30-second video clips) (or static images) of the dog responding to commands during an autonomous training session. The computer system can then present these video clips to the user within a user portal or transmit these video clips to the user (e.g., via a text message), thereby enabling the user to view "highlights" of the dog's training session and to visually track the dog's progress.

In one implementation, the training apparatus 100: loads a training protocol; accesses a target pose for the training protocol; initiates capture of a video; writes this video to a buffer; outputs a command (e.g., an audible and/or a visual command) according to the training protocol; tracks the dog in the working field; implements methods and techniques described above to detect and track the dog's pose; calculates a pose score for this instance of the command based on similarity (or "alignment") between the pose of the dog and the target pose. Then, if the pose score for this instance of the command exceeds pose scores for all other instances of the command served to the dog during this training session, the training apparatus 100 transfers the video to local memory and overwrites a previously-stored video from this training session. Conversely, if the pose score for this instance of the command falls below a pose score for another instance of the command served to the dog during this training session, the training apparatus 100 can discard this video and clear the buffer. The training apparatus 100 can repeat this process for each subsequent instance of the command served to the dog during the training session and then upload the last stored video to the computer system (or directly to the dog profile). The computer system can then serve this video to the user, such as with other metrics derived from the training session, thereby enabling the user to both quantify the dog's progress and view a best example of the dog's behavior during the training session.

In a similar example, the training apparatus 100 can implement similar methods and techniques to store a set of videos depicting the dog's response to commands served during the training session, such as: three videos corresponding to the top-three scores for responses by the dog to the command (e.g., "sit") during the training session; or three videos corresponding to the best, mean, median, and worst scores for responses by the dog to the command (e.g., "sit") during the training session. Additionally or alternatively, the training apparatus 100 can capture a set of videos of the dog response to commands served by the training apparatus 100 at intervals throughout the training session, such as of the first, tenth, twentieth, thirtieth, and fortieth instances—of a total of forty instances—of the command served to the dog by the training apparatus 100 during the training session. The training apparatus 100 can then upload these stored videos to the computer system (or directly to the dog profile), and the computer system can then present these videos to the user, thereby enabling the user to view multiple instances (or a "spread") of the dog's response to the command during the training session and/or the dogs progress within the single training session.

By recording images and/or video clips of the dog performing various skills during autonomous training sessions and presenting these videos to the user, the computer system can enable the user to both confirm autonomous training of her dog during these training sessions and to set expectations of her dog's behavior and/or skill level outside of these training sessions—such as during manual training sessions with the dog. For example, as the dog is initially learning the "sit" skill, the dog may not demonstrate a standard "sit" pose as expected by the user. However, the training apparatus 100 and the computer system can cooperate as described above: to capture video clips of the dog performing and developing the sit skill; and to present these videos to the user, thus demonstrating examples of the dog's best "sit" pose at the current time and for the dog's current level of training to the user. The user may then leverage these video clip to better visualize poses by the dog that should be rewarded responsive to commands issued by the user, thereby: improving continuity between command responses rewarded by the training apparatus 100 during the last autonomous training session and command responses rewarded by the user during subsequent interactions with the dog (e.g., during a subsequent manual training session); and improving the rate of training and development for the dog outside of autonomous training sessions.

8. MANUAL TRAINING

In one implementation, the computer system can leverage training scores and/or data collected during training sessions for a dog to educate a user (e.g., dog owner, dog trainer) on training her dog manually.

In one variation, the computer system can notify a user of training scores and/or overall training scores such that a user keeps informed of her dog's training progress and may plan her own training accordingly. For example, the computer system can generate a training report on a regular schedule (e.g., once per training session, once per day, once per week) and send the user (e.g., via the native application operating on a mobile device of the user) a copy of the training report according to the regular schedule. The computer system can also store the training report to the dog profile. In this example, the computer system may send the user a first training report including: a current training protocol assigned to the dog; a training score for the current training protocol; a prior training session completed; an training score corresponding to the prior training session; a list of skills the dog has mastered in training; and/or a list of exercises the user can perform with her dog to practice skills learned and/or practiced by the dog with the training apparatus 100 during the current training protocol.

In one variation, the computer system can provide manual training protocols to a user based on performance of a dog during autonomous training sessions. For example, the computer system can: notify the user of a first training score of "50 sit repetitions completed out of 500 sit repetitions required" for the dog learning the "sit" command; select a manual training protocol to be led by the user to the dog based on the first training score; and output this manual training protocol to the user. In this example, the computer system can output the manual training protocol stating: "Attempt 50 'sit' commands with your dog over a one-hour training period" or "Repeat the 'sit' command until your dog successfully enters the 'sit' pose at least 20 times" or "Stay with your dog for one-hour and feed the dog a primary reinforcer each time he enters the 'sit' pose on his own." The computer system can select these manual training protocols for the user based on the skill level of the dog and progression of the dog through training.

For example, in response to calculating a relatively high training score for a first autonomous training session, the computer system can select a first manual training protocol defining a first difficulty level. However, in response to calculating a relatively low training score for the first autonomous training session, the computer system can select a second manual training protocol defining a second difficulty level lower than the first difficulty level. Alternatively, in another example, the computer system can select a manual training protocol based on training progression of the dog between multiple autonomous training sessions. In particular, the computer system can: calculate a first training score for a first autonomous training session; calculate a second training score for a second autonomous training session; and characterize a training progression of the dog based on the first and second training scores. Then, in response to the training progression exceeding a threshold training progression, the computer system can select a first manual training protocol for the dog. Therefore, in this example, the computer system can leverage progress demonstrated by this particular dog to inform selection of manual training protocols.

In addition to providing instructions for training (e.g., number of repetitions, rewarding the dog) in the manual training protocol, the computer system may specify environmental characteristics for initiating manual training protocols such as a particular place, noise level, crowd level, etc. The computer system can update the suggested environment for manual training over time as a dog progresses in training (e.g., earns high training scores, completes training protocols) to increase and/or decrease a difficulty level of training. For example, the computer system can: access a dog profile for a dog; in response to the dog profile specifying a first autonomous training protocol and a first training score of "1/10", and select a first manual training protocol. The computer system can generate a first training report to send to the user specifying: the first autonomous training protocol and the first training score; the first manual training protocol; and a suggestion to the user to initiate the first manual training protocol at a first location. In this example, in response to the dog profile specifying a first training score of "1/10", the computer system can suggest to the user to attempt the first manual training protocol in a quiet room at the user's house. Later, as the dog continues training with the training apparatus 100 and progresses through the first autonomous training protocol, the computer system can generate a second training report to send to the user specifying: the first autonomous training protocol; a second training score; a second manual training protocol; and a second location at which the user may attempt the second manual training protocol with her dog. In this example, in response to the dog profile specifying first training score of "9/10", the computer system can suggest to the user to attempt the first manual training protocol in an outdoor park.

In one variation, the computer system can provide manual training protocols to a user to initiate with her dog during an autonomous training session with the training apparatus 100. In this variation, the computer system can incorporate a manual training protocol into an autonomous training session to combine dog training with the user and the training apparatus 100. For example, the computer system can: initiate a first autonomous training session with a dog with a user present, the first autonomous training session following an autonomous training protocol for teaching the dog a "sit" command; in response to the dog entering the "sit" pose, prompt the user (e.g., owner of the dog) to stand near the dog (e.g., within five feet) and walk a threshold distance (e.g., 20 feet, 50 feet, towards a door of a room in which the training apparatus 100 is located) away from the dog; and dispense units of primary reinforcer upon detection that the dog has maintained the "sit" pose (e.g., at a set interval). Therefore, the computer system can combine an autonomous training session protocol with a manual training protocol to adjust a level of difficulty of autonomous training sessions and incorporate the user in autonomous training sessions with her dog.

The computer system can therefore provide tools for the user to continue training with her dog on her own in combination with autonomous training sessions with the training apparatus 100, thus limiting the work required of the user in organizing training for her dog while enabling the user to bond with her dog and be involved in practicing skills with her dog.

9. ADDITIONAL AUTONOMOUS TRAINING SESSIONS

In one implementation, the computer system can select a next training session based on a training score(s) from a previous training sessions(s). For example, the computer system and/or training apparatus 100 can: identify a first dog at the training apparatus 100; access a first dog profile for the first dog; in response to the first dog profile specifying—for a first autonomous training session following a first autonomous training protocol—a first training score of "10%" for the "sit" command, initiate a second training session following the first autonomous training protocol, such that the dog may repeat the training from the first autonomous training protocol. Alternatively, in response to the first dog profile specifying a first training score of "50%" for the "sit" command, the computer system can initiate a second autonomous training session and continue the first training protocol forward from the previous autonomous training session without repeating content from the previous autonomous training session. However, in response to the first dog profile specifying a first training score of "90%" for the "sit" command, the training apparatus 100 can initiate a second training session following a second training protocol, the second training protocol more advanced than the first autonomous training protocol and/or corresponding to a different command.

In one variation, the computer system can prompt the user to provide feedback regarding a manual training session(s) preceding the second training session. In this variation, the computer system can leverage feedback provided by the user to inform training during the second autonomous training session. For example, the computer system—in combination with the training apparatus 100—can initiate a first autonomous training session for a dog according to a first autonomous training protocol for the "sit" command. In response to the dog accurately entering the "sit" pose for 90% of "sit" attempts, the computer system can estimate a high training score for the dog. After the first autonomous training session, the computer system can prompt the user to execute a first manual training session with her dog according to a first manual training protocol for the "sit" command, the first manual training protocol including practicing the "sit" command 50 times outside. Prior to initiation of a second autonomous training session, the computer system can prompt the user to input feedback regarding the first manual training session. In response to the user feedback specifying difficulty with the "sit" pose during the first manual training session, the computer system can repeat the first autonomous training protocol during the second autonomous training session and/or modify the first autonomous training protocol to better reinforce the "sit" behavior for the dog.

10. TRACKING PROGRESS

The computer system can track progress of the dog over multiple training sessions to inform selection of autonomous and manual training protocols for the dog and/or to inform the user of the dog's training progress over time. By monitoring the dog's progress over time, the computer system can continue tailoring autonomous training sessions better matched to the dog, updating the dog profile, and suggesting updated manual training protocols to the user to more effectively train the user's dog.

In one implementation, the computer system can characterize progress of the dog based on changes in the training score across a set of training sessions. For example, during an initial period, the computer system can load a first training protocol for the "sit" skill onto the training apparatus 100 in preparation for a first autonomous training session for a dog. During the first autonomous training session, the computer system can: access a first video feed of the working field near the training apparatus 100; detect the dog in the first video feed; and trigger dispensation of treats responsive to the dog entering the "sit" pose according to the first autonomous training protocol. During a first interim period succeeding the first autonomous training session, the computer system can: calculate a first training score for the first autonomous training session for the dog learning the "sit" pose based on images of the dog extracted from the first video feed. Then, during a second autonomous training session with the dog succeeding the first autonomous training session, the computer system can: access a second video feed of the working field near the training apparatus 100; detect the dog in the second video feed; and trigger dispensation of treats responsive to the dog entering the "sit" pose according to the first autonomous training protocol. During a second interim period succeeding the second autonomous training session, the computer system can calculate a second training score for the second autonomous training session for the dog learning the "sit" pose based on images of the dog extracted from the second video feed. The computer system can then characterize a difference between the first and second training score for the dog and store this difference—representative of the dog's progress between the first and second autonomous training session—at the dog profile for this dog.

In the preceding example, the computer system can report this difference in training scores (e.g., between consecutive autonomous training sessions) to the user to inform the user of the dog's progress. For example, the computer system can transmit a prompt to the user stating: "Your dog's training score for today's autonomous training session is 90%. Her score has improved by 10% since yesterday's autonomous training session." The computer system can therefore encourage the user to continue instigating autonomous training sessions for her dog and implementing manual training sessions with her dog.

In particular, in another example, after a first autonomous training session, the computer system can prompt the user to execute a particular manual training protocol during a first manual training session. The computer system can prompt the user to confirm whether the user completed the first manual training session prior to initiation of a second autonomous training session. Then, after the second autonomous training session, in response to a second training score for the second autonomous training session significantly (e.g., greater than a threshold difference) exceeding a first training score for the first autonomous training session and receiving confirmation of completion of the particular manual training protocol, the computer system can transmit a prompt to the user indicating this advanced progression of her dog through the first autonomous training protocol and encouraging the user to complete a second manual training session according to the particular manual training protocol to further reinforce her dog's learning of these behaviors.

In one implementation, the computer system can report progress of the dog (e.g., differences in training scores) to the user between training sessions spanning a particular duration (e.g., five autonomous training sessions, one week, one month) indicative of long-term progress of the dog across multiple autonomous training sessions. Additionally and/or alternatively, the computer system can report progress of the dog to the user responsive to the dog achieving a particular milestone. For example, the computer system can transmit a prompt to the user stating: "Congratulations! Your dog successfully completed 50 'sit' actions responsive to the 'sit' command during her autonomous training session today. She has doubled her original score from the first autonomous training session, during which she successfully completed 25 'sit' actions response to the 'sit' command." By informing the user of the dog's progress over time, the computer system can encourage the user to continue initiating autonomous training sessions for her dog and practicing these behaviors during manual training with her dog.

In one implementation, the computer system can extrapolate a training trajectory of the dog, such as for a particular training protocol and/or a particular set of skills. In this implementation, the computer system can leverage this training trajectory to predict future training scores for the dog for future autonomous training sessions. For example, based on a first training score from a first autonomous training session and a second training score from a second autonomous training session, both the first and second autonomous training sessions executed according to a first autonomous training protocol, the computer system can characterize a training trajectory of the animal for the first autonomous training protocol. Based on this training trajectory, the computer system can predict a third training score for a (future) third autonomous training session. The computer system can leverage this predicted third training score to amend the first autonomous training protocol and/or adjust a manual training protocol suggested to the user. In particular, in this example, in response to the user executing a first manual training protocol during a first manual training session, after the first autonomous training session and, in response to the third training score falling below a target training score, the computer system can select a second manual training protocol in replacement of the first manual training protocol for suggesting to the user.

In one implementation, the computer system can update an overall training score based on training scores of multiple discrete autonomous training sessions with the dog. The computer system can leverage this overall training score to better represent a dog's understanding of a particular skill and/or to adjust training accordingly. For example, the computer system can load a first autonomous training protocol, corresponding to the "stay" command, for a first dog onto the training apparatus 100. The computer system can then execute a set of autonomous training sessions according to the first autonomous training protocol for the "stay" command. For each autonomous training session in the set of autonomous training sessions, the computer system can estimate a training score for the "stay" command. In particular, the computer system can: estimate a first training score of "92/100" for a first autonomous training session; estimate a second training score of "96/100" for a second autonomous training session; and estimate a third training score of "60/100" for a third autonomous training session. Based on each of these training scores, the computer system can calculate an overall training score of "83/100." for the "stay" command. Rather than select a next autonomous and/or manual training protocol based solely on the third training score, the computer system can leverage this overall training score to inform selection of the next autonomous and/or manual training protocol. Therefore, by calculating an overall training score for the dog, the computer system can account for overall trends and/or outliers in training data for the dog when selecting future training protocols and/or reporting training results to the user.

11. DOG ANXIETY

In one variation, the computer system can characterize anxiety levels of a dog and track changes in anxiety levels over time. In this variation, the computer system and/or the training apparatus 100 can measure and record various metrics (e.g., that may be indicative of dog anxiety) during training sessions in order to characterize anxiety levels.

In particular, during a first autonomous training session with the dog, the computer system can: access a video feed of the working field near the training apparatus 100 configured to dispense units of a primary reinforcer based on behaviors performed by the animal responsive to commands output by the training apparatus 100; detect the dog in the video feed; and track an anxiety level of the dog based on the video feed.

Additionally, upon termination of the first autonomous training session, the computer system can calculate an anxiety score for the dog based on the anxiety level of the dog throughout the first autonomous training session. For example, during the first autonomous training session, the computer system can: at a first time, characterize a first anxiety level of the dog based on behaviors of the dog recorded in the video feed at approximately the first time;

and, at a second time succeeding the first time, characterize a second anxiety level of the animal based on behaviors of the dog recorded in the video feed at approximately the second time. Then, during a first interim period succeeding the first autonomous training session, the computer system can calculate a first anxiety score for the animal based on the first anxiety level and the second anxiety level of the animal during the first autonomous training session.

In one implementation, the computer system can characterize anxiety levels of a dog based on the dog's performance during training sessions. For example, the computer system and/or training apparatus 100 can: output a first command and/or audible tone corresponding to a "sit" command; record a first time at which the first command is output; in response to detecting the dog entering the "sit" pose, record a second time; calculate a duration from the first time to the second time representing a delay between the dog hearing the first command and obeying the first command; and characterize an anxiety level of the dog based on the duration calculated. If the dog waited five seconds after hearing the "sit" command before entering the "sit" pose, the computer system can calculate an anxiety score of "7 out of 10" based on an expected duration (e.g., one second). Alternatively, if the dog waited less than one second after hearing the "sit" command before entering the "sit" pose, the computer system can calculate an anxiety score of "1 out of 10." The computer system can then calculate a composite anxiety score for an autonomous training session based on each of these anxiety levels (e.g., each anxiety level for each command issued) recorded during the autonomous training session.

In another example, the computer system can: track a duration from a first time at which a primary reinforcer is dispensed by the training apparatus 100 and a second time at which the dog eats the primary reinforcer; and calculate an average duration based on each duration recorded each time the primary reinforcer was dispensed during an autonomous training session. In this example, if the average duration between dispensation of a primary reinforcer and consumption of the primary reinforcer by the dog exceeds a threshold duration (e.g., five seconds, ten seconds, thirty seconds), the computer system can classify the dog as "highly anxious". Alternatively, if the average duration falls below the threshold duration but above an expected duration, the computer system can classify the dog as "anxious".

In another implementation, the computer system can characterize anxiety levels of a dog based on images of the dog recorded by the training apparatus 100. For example, the computer system can access images of the dog captured throughout an autonomous training session and detect poses and behaviors indicative of anxiety (e.g., body posture, facial expression, eye position, tail posture). Based on these images and detected behaviors, the computer system can characterize a series of anxiety levels of the dog throughout the autonomous training session, each anxiety level in the set of anxiety levels corresponding to a particular image. For example, at a first time during an autonomous training session, the computer system can: access the video feed to extract a current body posture of the dog; access a target body posture indicative of a minimum anxiety level of the dog; calculate a deviation between the current body posture and the target body posture; and characterize an anxiety level of the dog based on the deviation. The computer system can repeat this process at a set frequency (e.g., once per second, once per minute, five times per autonomous training session) to characterize a series of anxiety levels for the dog throughout the autonomous training session. The computer system can then calculate and report an anxiety score for the dog (e.g., as an average of each anxiety level in the series of anxiety levels) for this autonomous training session and record this to the dog profile. In another example, the computer system can combine performance data (e.g., time to "sit" after "sit" command issued) and image data (e.g., postures of the dog) to characterize anxiety levels of the dog and calculate an anxiety score for a dog.

Additionally and/or alternatively, in this implementation, the computer system can characterize anxiety levels of the dog based on vocalizations of the dog recorded by the training apparatus 100. For example, the computer system can access an audio feed recorded at the training apparatus throughout an autonomous training session to detect dog vocalizations indicative of anxiety (e.g., barking, whining, panting). The computer system can extract characteristics of these dog vocalizations (e.g., type of vocalization, volume, duration of repeated vocalizations) to characterize anxiety levels of the dog throughout the autonomous training session. The computer system can then calculate an anxiety score for the dog for this autonomous training session based on these anxiety levels throughout the autonomous training session. For example, in response to detecting loud, repeated barking by the dog throughout the autonomous training session, the computer system can calculate a relatively high anxiety score for the dog. Alternatively, in response to detecting low-volume, sporadic barking by the dog throughout the autonomous training session, the computer system can calculate a relatively low anxiety score for the dog.

In another implementation, the computer system can access biometrics of the dog recorded by a sensor coupled to the dog to characterize anxiety levels of the dog. In particular, the computer system can interface with a sensor (e.g., heart rate sensor, galvanic skin response sensor) coupled to an accessory worn by the dog, such as a collar, a harness, and/or a vest. For example, prior to an autonomous training session, the computer system can generate and transmit a prompt to the user indicating to place a training collar—including a heart rate sensor—on her dog prior to the autonomous training session. In response to receiving confirmation that the dog is wearing the training collar, the computer system can continuously access the heart rate sensor to track an anxiety level of the dog during the autonomous training session. The computer system can then calculate an anxiety score of the dog for this autonomous training session based on the anxiety level of the dog throughout the autonomous training session. For example, during an autonomous training session, the computer system can: at a first time, access a first heart rate measurement captured by the sensor to characterize a first anxiety level of the dog (e.g., proportion the first heart rate measurement) at approximately the first time; and, at a second time succeeding the first time, access a second heart rate measurement captured by the sensor to characterize a second anxiety level (e.g., proportional the second heart rate measurement) of the dog at approximately the second time. The computer system can then calculate an anxiety score for the first autonomous training session based on a combination of the first and second anxiety levels.

Additionally and/or alternatively, in yet another implementation, the computer system can calculate an anxiety score for the dog based on the video feed, the audio feed, and/or a set of biometrics. In particular, the computer system can: calculate an audio anxiety score for the dog based on characteristics (e.g., type of vocalization, volume, duration) of dog vocalizations detected in the audio feed; calculate a visual anxiety score for the dog based on performance (e.g., response to commands) and/or postures (e.g., cowering, shaking) of the dog detected in the video feed; calculate a biometric anxiety score of the dog based on biometrics (e.g., heart rate) recorded by a sensor worn by the dog; and calculate a composite anxiety score based on the audio anxiety score, the visual anxiety score, and the biometric anxiety score.

In one implementation, the computer system can leverage anxiety level data from acclimation and/or autonomous training sessions with the dog to identify behaviors (e.g., cowering, whimpering, not consuming treats) indicative of anxiety for this particular dog. For example, the computer system can: execute a first set of acclimation sessions for a first dog; and, based on behaviors of the first dog detected in a first set of video and audio feeds recorded during the first set of acclimation session, identify a first set of behaviors (e.g., quiet, immobile, refusal to consume treats) indicative of high anxiety levels for the first dog. The computer system can then store these first set of behaviors in a first dog profile corresponding to the first dog. Additionally, the computer system can: execute a second set of acclimation sessions for a second dog; and, based on behaviors of the second dog detected in a second set of video and audio feeds recorded during the second set of acclimation session, identify a first set of behaviors (e.g., frequent barking, restless) indicative of high anxiety levels for the second dog. The computer system can then store these second set of behaviors in a second dog profile corresponding to the second dog.

Later, at a first time, during a first autonomous training session for the first dog, the computer system can estimate a high anxiety level for the first dog based on identifying the first set of behaviors in a video feed of the first autonomous training session at approximately the first time. Additionally and/or alternatively, at a second time, during a second autonomous training session for the second dog, the computer system can estimate a low anxiety level for the second dog based on identifying the first set of behaviors in a video feed of the second autonomous training session at approximately the second time. However, at a third time during the second autonomous training session, in response to identifying the second set of behaviors in the video feed at approximately the third time, the computer system can estimate a high anxiety level for the second dog.

In one implementation, the computer system can characterize a baseline anxiety level for the dog over a set of acclimation and/or autonomous training sessions. The computer system can then access this baseline anxiety level when selecting training protocols for the dog, and adjust training sessions appropriately. For example, the computer system can, for a first dog, access a first dog profile corresponding to the first dog and specifying a first baseline anxiety level of "8 out of 10" indicating a relatively high baseline anxiety level; and select a first autonomous training protocol corresponding to the "sit" command for the first dog based on the first baseline anxiety level. Then, for a second dog, the computer system can: access a second dog profile corresponding to the second dog and specifying a second baseline anxiety level of "2 out of 10"; and select a second training protocol corresponding to the "sit" command for the second dog based on the second baseline anxiety level. In this example, the computer system can select the first autonomous training protocol focused on lowering anxiety level as well as teaching the "sit" command for the first dog and select the second training protocol solely focused on teaching the dog the "sit" command. Therefore, the computer system can estimate a dog's anxiety level during acclimation and/or training sessions to select and/or modify training sessions for the dog in order to minimize the dog's anxiety during autonomous training sessions with the training apparatus 100.

In one implementation, the computer system can track anxiety levels across multiple training sessions to monitor changes in anxiety levels of the dog over time. For example, the computer system can: calculate a first anxiety score of "80%" corresponding to high levels of anxiety during a first autonomous training session; calculate a second anxiety score of "50%" corresponding to intermediate levels of anxiety during a second training session; and calculate a third anxiety score of "30%" corresponding to low levels of anxiety during a third training session. The computer system can then calculate an anxiety level reduction of "50%" over 3 training sessions and record this information to the dog profile. Additionally, the computer system can notify a user(s) of the dog's anxiety level for each training session and/or of the dog's change in anxiety levels (e.g., anxiety level reduction) across multiple training sessions.

The computer system can track a dog's anxiety over multiple autonomous training sessions and notify the dog's owner and/or boarding facility employee (e.g., via the native application) of her dog's anxiety and/or any changes in the dog's anxiety levels. For example, the computer system can include an anxiety score in a daily training report sent to the user. In this example, for a dog with high anxiety, the computer system can specify an anxiety level of "9 out of 10" or "high anxiety". Later, after the dog has completed several acclimation sessions configured to lower the dog's anxiety, the computer system can specify an anxiety level of "2 out of 10" or "low anxiety." By providing updates to the user regarding her dog's anxiety level during autonomous training sessions, the computer system can establish a sense of trust with the user and provide comfort to the user in leaving her dog alone with the training apparatus 100 (e.g., at a dog boarding facility).

In one variation, the computer system can characterize and track anxiety levels of the dog outside of autonomous training sessions with the dog. For example, the computer system can semi-continuously (e.g., once every ten seconds, once every minute, continuously between 6:00 AM and 10:00 PM) access a video feed of the working field captured at the training apparatus. In response to detecting the dog in the video feed, the computer system can: record the video feed; characterize an anxiety level of the dog based on the dog's actions, posture, and/or mannerisms over a particular duration as detected in the video feed; and, in response to the dog's anxiety level remaining elevated over the particular duration, calculate an elevated anxiety score for the dog for the particular duration. The computer system can then: store this anxiety score and a timestamp corresponding to the anxiety score in the dog profile; and alert the user of the dog's elevated anxiety in real-time. The computer system can then leverage this elevated anxiety score of the dog to select training protocols for the dog and adjust future training sessions appropriately.

Additionally and/or alternatively, in this example, the computer system can semi-continuously access: an audio feed captured at the training apparatus to detect dog vocalizations indicative of anxiety; and/or access a set of biometrics of the dog recorded by a sensor coupled to an accessory worn by the dog to detect biometrics indicative of anxiety. The computer system can then: calculate an anxiety score for the dog based on the dog's visual behaviors (posture, movement), vocalizations, and/or biometrics; store this anxiety score in the dog profile; and leverage this anxiety score—for a particular period distinct from an autonomous training session—to modify training (e.g., autonomous and/or manual) for this dog.

In another example, the computer system can semi-continuously access an audio feed captured at the training apparatus (e.g., via a microphone installed on the training apparatus). Then, in response to detecting dog vocals (e.g., barking, whining) in the audio feed, the computer system can: record the audio feed; characterize anxiety levels of the dog based on these dog vocals detected in the audio feed, such as based on a type of dog vocals (e.g., barking, whining), a volume, a duration (e.g., over which dog vocals are repeatedly detected), and/or whether human vocals are also detected within the duration; calculate an anxiety score for the dog as an average of the anxiety levels of the dog over the duration; and store this anxiety score with a corresponding timestamp in the dog profile.

In yet another example, the computer system can semi-continuously access biometrics of the dog—outside of autonomous training sessions with the dog—measured by a sensor coupled to the dog. In particular, the computer system can interface with the sensor (e.g., heart rate sensor, galvanic skin response sensor) coupled to an accessory worn by the dog, such as a collar, a harness, and/or a vest to monitor anxiety levels of the dog outside of autonomous training sessions.

11.1 Dog Anxiety Management

In one variation, the computer system can modify an autonomous training protocol in (near) real time based on the anxiety level of the dog during an autonomous training session. For example, the computer system can initiate a first autonomous training session for the dog according to a first autonomous training protocol. During the first autonomous training session, the computer system can track an anxiety level of the dog based on images of the dog extracted from a video feed recorded at the training apparatus 100. Then, in response to the anxiety level of the dog exceeding a threshold anxiety level during the autonomous training session, the computer system can: access a set of intervention actions (e.g., dispensation of multiple treats, termination of the autonomous training session, reducing a volume level of audio output by the training apparatus 100) configured to reduce anxiety of the dog; select a first intervention action, from the set of intervention actions, based on the anxiety level of the dog; and, at the training apparatus 100, execute the first intervention action during the first autonomous training session. In this example, in response to detecting a decrease in the anxiety level of the dog after execution of the first intervention action, the computer system can trigger continuation of the first autonomous training session according to the first autonomous training protocol. Alternatively, in response to detecting no change or an increase in the anxiety level of the dog after execution of the first intervention action, the computer system can select a second action, from the set of intervention actions, for execution at the training apparatus 100 in order to reduce the anxiety level of the dog. Additionally and/or alternatively, in response to the anxiety level of the dog exceeding a maximum threshold anxiety level, the computer system can automatically terminate the first autonomous training session. Further, the computer system can alert a user (e.g., via her mobile device) of the dog's high anxiety level and/or prompt the user to comfort her dog.

In another example, the computer system can select actions for managing changes in anxiety levels of the dog based on historical anxiety data of the dog stored in the dog profile. In particular, in this example, the computer system can: initiate a first autonomous training session for the dog according to a first autonomous training protocol; and, during the first autonomous training session, track an anxiety level of the dog based on images of the dog extracted from a video feed recorded at the training apparatus 100. Then, in response to the anxiety level of the dog exceeding a threshold anxiety level during the autonomous training session, the computer system can: access a set of intervention actions configured to reduce the anxiety level of the dog; select a first intervention action (e.g., adjusting dispensation trajectory of treats) from the set of intervention actions; and execute the first intervention action at the training apparatus 100. Later, during the first autonomous training session, in response to the anxiety level remaining above the first threshold anxiety level, the computer system can: select a second intervention action (e.g., automatically dispensing a quantity of treats to the dog) from the set of intervention actions; execute the second intervention action at the training apparatus 100; and monitor the dog's anxiety level after execution of the second intervention action. In response to the anxiety level of the dog decreasing after execution of the second intervention action, the computer system can: flag the second intervention action as effective for mitigating anxiety for this dog; and discard the first intervention action is ineffective for mitigating anxiety for this dog. Later, during a second autonomous training session with the dog, in response to the anxiety level of the dog exceeding the threshold anxiety level, the computer system can access the dog profile and select the second intervention action for execution during the second autonomous training session. Therefore, by tracking the anxiety level before and after executing both the first and second intervention techniques, the computer system can leverage changes in the anxiety of the dog responsive to these intervention actions to identify a subset of intervention actions that are most effective in reducing anxiety level specifically for this dog. The computer system can store this subset of intervention actions and anxiety data for training sessions in the dog profile.

In another variation, the computer system can prompt the user to execute a user intervention action (e.g., moving the training apparatus to a different location in her home, reducing background noise during autonomous training sessions) prior to a next autonomous training session for the dog in order to reduce the dog's anxiety level during the next autonomous training session. For example, the computer system can: execute a first autonomous training session according to a first autonomous training protocol; and estimate an anxiety score for the dog for the autonomous training session. In response to the anxiety score for the first autonomous training session exceeding a threshold anxiety score, the computer system can: access the video and audio feeds recorded during the first autonomous training session; identify a series of instances corresponding to high anxiety levels of the dog based on images of the dog and audio recordings of the first autonomous training session extracted from the video and audio feeds; and identify a cause of the high anxiety levels of the dog based on these images and audio recordings. In this example, in response to identifying secondary noise in the background across the series of instances of high anxiety for the dog, the computer system can identify "background noise" (e.g., other animal vocalizations, human vocalizations, television sound, doorbell ringing) as a potential cause of the high anxiety. The computer system can then prompt the user (e.g., via text message) to relocate the training apparatus 100 to a quieter room in her home or to a more isolated area (e.g., with reduced background noise) in a dog-boarding facility. Prior to initiation of the next autonomous training session, the user can confirm relocation of the training apparatus 100. In another example, in response to the anxiety score of the dog exceeding a threshold anxiety score for the first autonomous training session, the computer system can prompt the user to be present with her dog during an initial portion of the next autonomous training session.

In one variation, the computer system can implement mitigation techniques responsive to instances of anxiety detected outside of autonomous training sessions. In particular, the computer system can: characterize and track anxiety levels of the dog outside of autonomous training sessions with the dog over a particular duration; calculate an anxiety score for the dog for this particular duration; and, in response to the anxiety score exceeding a threshold anxiety score, execute an intervention action configured to reduce the dog's anxiety.

For example, during an interim period between autonomous training sessions, the computer system can access images of the working field, captured at the training apparatus, according to a set frequency (e.g., once every second, once every ten seconds, once per minute). In response to detecting the dog present in the working field, the computer system can: access a video feed of the dog in the working field; extract a series of positions, postures, and/or facial expressions of the dog from the video feed over a particular duration; and characterize an anxiety level of the dog throughout the particular duration based on these positions, postures, and/or facial expressions. The computer system can then calculate an anxiety score for this dog based on the anxiety level of the dog over the particular duration. Then, in response to the anxiety level exceeding a threshold anxiety, the computer system can automatically initiate a brief (e.g., five-minute) autonomous training session with the dog in order to reduce the dog's anxiety, such as by dispensing a series of treats to the dog to comfort the dog.

Additionally and/or alternatively, in the preceding example, the computer system can access: an audio feed, captured at the training apparatus, at a set frequency to detect dog vocalizations that may be indicative of anxiety; and/or biometrics (e.g., heart rate data) captured by a sensor worn by the dog (e.g., on a dog collar) to detect instances of anxiety for the dog. In this example, in response to detecting dog vocalizations and/or biometrics indicative of anxiety, the computer system can similarly initiate an autonomous training session with the dog configured to reduce anxiety of the dog.

12. TRAINING COACH

In one variation, the computer system can prompt the user to share the dog profile with a third-party user to manage training and/or provide suggestions to the user for improving training with her dog. In this variation, the computer system and/or training apparatus can host or interface with a coach portal (e.g., via native application or web application)—executing on a computing device (e.g., a smartphone, a tablet) of the training coach—to: configure a series of training protocols (e.g., autonomous and/or manual) for the user's dog; extract insights from training data from autonomous training sessions with the dog; and/or to provide suggestions to the user for improving manual training with her dog.

For example, the computer system can interface with the coach (e.g., via the coach portal) after a set of acclimation sessions for the dog to configure a particular training protocol for a first set of autonomous training sessions for the dog, based on the dog's performance (e.g., based on the dog's acclimation score and/or anxiety score) during the set of acclimation sessions, and store this particular training protocol—selected by the coach—at the dog profile for this dog. In this example, the computer system can generate and transmit notifications to both the user and the coach regarding the dog's performance during acclimation and/or autonomous training sessions with the dog.

In one implementation, the computer system can enable the user and the training coach to interface directly (e.g., via text message, via video conference) to discuss training of the user's dog. For example, the computer system can prompt the user to complete a survey regarding manual training on a regular schedule (e.g., after each manual training session, once per week, once per month). In response to receiving the completed survey back from the user (e.g., via the user portal), the computer system can: supply the completed survey to the training coach (e.g., via the coach portal); and prompt the training coach to review training data from recent autonomous training sessions with the user's dog and the completed survey from the user regarding manual training sessions with the dog. The computer system can then schedule a video conference between the training coach and the user to discuss the dog's training schedule and/or training progression. After this video conference, the computer system can prompt the training coach to input any updates to the dog's training schedule such as: changes to the autonomous training protocol; changes to the manual training protocol; a particular intervention action for the next autonomous training session; a particular user intervention action for the next autonomous training session; a set of suggestions for the user for the next manual training session; etc. The computer system can store these updates to the dog profile. Therefore, in this example, before initiating the next autonomous training session, in response to the training coach selecting a second training protocol in replacement of a first training protocol executed in a preceding autonomous training session, the computer system can automatically load the second training protocol in preparation for the autonomous training session.

In one implementation, the computer system can interface with the coach (e.g., via the coach portal) to develop a training model for analyzing training data (e.g., from video and/or audio feeds recording during autonomous training sessions) for the dog. For example, the computer system can: access video and audio feeds for each autonomous training session recorded by the training apparatus during an initial setup period; and transmit these video and audio feeds to the training coach at the training portal for analysis. At the coach portal, the computer system can prompt the coach to label instances of a set of behaviors of the dog, such as: instances of behavior indicative of anxiety; instances of behavior indicative of disinterest; instances of behavior indicative of motivation; instances of failure; instances of successes; etc. Based on these labels, the computer system can develop a training model unique to this particular dog for analyzing future training data and/or modifying training of the dog accordingly.

The computer system and/or training apparatus 100 are described above as executing the method S100 to train an individual dog—such as at the user's home—and to return training-related prompts to the dog's owner based on the dog's performance during training sessions at the training apparatus 100. However, the computer system and/or training apparatus 100 can similarly execute the method S100 to train multiple dogs present in the user's home over time and to return training-related prompts for these dogs to the user based on performance of these dogs during their corresponding training sessions. Additionally or alternatively, the training apparatus 100 can be installed or located at a boarding facility, a training facility, an animal shelter, or other facility, and can return training-related prompts to facility staff and/or these dogs' owners based on performance of these dogs during their corresponding training sessions at the training apparatus 100.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for training an animal, comprising:
   during an initial period, loading a first autonomous training protocol onto a training apparatus;
   during a first autonomous training session for the animal:
      accessing a video feed recorded by an optical sensor integrated into the training apparatus and defining a field of view intersecting a working field;
      detecting the animal in the video feed; and
      dispensing units of a primary reinforcer via a dispenser, integrated into the training apparatus, based on behaviors performed by the animal according to the first autonomous training protocol; and
   during an interim period succeeding the first autonomous training session:
      calculating a first training score for the animal based on behaviors performed by the animal during the first autonomous training session; and
      in response to the first training score falling below a threshold training score, selecting a first manual training protocol, from a set of manual training protocols, for execution during manual training between a user associated with the animal and the animal, based on the first training score.

2. The method of claim 1, further comprising:
   generating a prompt to execute the first manual training protocol with the animal during a first manual training session prior to a next autonomous training session for the animal; and
   transmitting the prompt to a user associated with the animal.

3. The method of claim 1, wherein selecting the first manual training protocol, from the set of manual training protocols, in response to the first training score falling below the threshold training score comprises:
   accessing the set of manual training protocols comprising:
      the first manual training protocol defining a first difficulty level; and
      a second manual training protocol defining a second difficulty level greater than the first difficulty level; and
   in response to the first training score falling below the threshold training score, selecting the first manual training protocol defining the first difficulty level.

4. The method of claim 1, further comprising, in response to the first training score exceeding the threshold training score, selecting a second manual training protocol, from the set of training protocols, for execution during manual training between the user and the animal.

5. The method of claim 1:
   further comprising, during the first autonomous training session:
      tracking a quantity of attempts of a set of commands output by the training apparatus for the animal; and
      tracking a quantity of successes of the quantity of attempts for the animal; and
   wherein calculating the first training score based on behaviors performed by the animal during the first autonomous training session comprises calculating the first training score based on the quantity of attempts and the quantity of successes during the first autonomous training session.

6. The method of claim 1, further comprising:
   during a second autonomous training session succeeding the first autonomous training session:
      accessing a second video feed of the working field;
      detecting the animal in the second video feed; and
      dispensing units of the primary reinforcer based on behaviors performed by the animal according to the first autonomous training protocol; and
   during a second interim period succeeding the second autonomous training session:
      calculating a second training score for the second autonomous training session based on behaviors performed by the animal during the second autonomous training session; and
      in response to the second training score falling below a second threshold training score, selecting a second manual training protocol, from the set of manual training protocols, for execution during manual training, based on the second training score.

7. The method of claim 6, wherein selecting the second manual training protocol for execution during manual training based on the second training score comprises:
   characterizing a difference between the first training score and the second training score for the animal; and
   in response to the difference falling below a threshold difference, selecting a second manual training protocol, from the set of manual training protocols, in replacement of the first manual training protocol.

8. The method of claim 1, further comprising, calculating an anxiety score for the animal for the first autonomous training session based on body language of the animal in the video feed.

9. The method of claim 8, further comprising, calculating a composite training score for the first autonomous training session based on the anxiety score and the first training score.

10. The method of claim 8, wherein calculating the anxiety score for the animal for the first autonomous training session comprises:
   characterizing an anxiety level of the animal during the first autonomous training session based on body language of the animal extracted from the video feed; and
   calculating the anxiety score for the animal based on the anxiety level of the animal throughout the first autonomous training session.

11. The method of claim 10, further comprising, in response to the anxiety level exceeding a threshold anxiety level during the first autonomous training session:
   selecting a first intervention action, from a set of intervention actions, configured to reduce the anxiety level during the first autonomous training session;
   at the training apparatus, executing the first intervention action.

12. The method of claim 1, further comprising:
   during a second autonomous training session succeeding the first autonomous training session:
      accessing a second video feed of the working field;
      detecting the animal in the second video feed; and
      dispensing units of the primary reinforcer based on behaviors performed by the animal according to the first autonomous training protocol;
   during a second interim period succeeding the second autonomous training session:
      calculating a second training score for the second autonomous training session based on behaviors performed by the animal during the second autonomous training session;
      characterizing a training progression of the animal for the first autonomous training protocol based on the first training score and the second training score; and
      in response to the training progression falling below a threshold training progression, amending the first manual training protocol.

13. The method of claim 1, wherein dispensing units of the primary reinforcer based on behaviors performed by the animal comprises, during the first autonomous training session:
   outputting a command;
   detecting a first action of the animal in the video feed responsive to the command;
   characterizing a difference between the first action and a set of actions corresponding to the command; and
   in response to the difference falling below a threshold, dispensing a first unit of the primary reinforcer into the field.

14. A method for autonomously training an animal comprising:
   during a first autonomous training session with the animal:
      accessing a video feed recorded by an optical sensor integrated into a training apparatus and defining a field of view intersecting a working field;
      detecting the animal in the video feed;
      dispensing units of a primary reinforcer via a dispenser, integrated into the training apparatus, based on behaviors performed by the animal according to the first autonomous training protocol; and
      tracking an anxiety level of the animal based on behaviors of the animal detected in the video feed; and
   during an interim period succeeding the first autonomous training session:
      calculating a composite training score for the animal based on the anxiety level and behaviors performed by the animal during the first autonomous training session; and
      in response to the composite training score exceeding a threshold training score, selecting a first manual training protocol, from a set of manual training protocols, for execution during manual training between a user associated with the animal and the animal, based on the composite training score.

15. The method of claim 14, further comprising:
   generating a prompt to execute the first manual training protocol with the animal during a first manual training session preceding a next autonomous training session; and
   transmitting the prompt to a user associated with the animal.

16. The method of claim 14, wherein calculating the composite training score based on the anxiety level and behaviors performed by the animal during the first autonomous training session comprises:
   calculating an anxiety score for the animal based on the anxiety level of the animal throughout the first autonomous training session;
   calculating a training score for the animal based on behaviors performed by the animal during the first autonomous training session; and
   calculating the composite training score based on a combination of the anxiety score and the training score.

17. The method of claim 14, wherein tracking the anxiety level of the animal comprises:
   at a first time during the first autonomous training session:
      extracting a first image of the animal from the video feed captured at approximately the first time;
      characterizing a first posture of the animal based on the first image; and
      characterizing a first anxiety level of the animal based on the first posture; and
   at a second time succeeding the first time during the first autonomous training session:
      extracting a second image of the animal from the video feed captured at approximately the second time;
      characterizing a second posture of the animal based on the second image; and
      characterizing a second anxiety level of the animal based on the second posture.

18. The method of claim 14, further comprising, at a first time, during the first autonomous training session, in response to the anxiety level exceeding a threshold anxiety level:
   selecting a first intervention action, from a set of intervention actions, configured to reduce the anxiety level of the animal; and
   at the training apparatus, executing the first intervention action at approximately the first time.

19. The method of claim 14, further comprising:
   during a second autonomous training session with the animal succeeding the first manual training session:
      accessing the video feed of the working field near the training apparatus;
      detecting the animal in the video feed; and
      tracking a second anxiety level of the animal based on behaviors of the animal detected in the video feed; and during a second interim period succeeding the second autonomous training session:
 characterizing a difference between the anxiety level for the first autonomous training session and the second anxiety level for the second autonomous training session; and
 in response to the difference falling below a threshold difference:
  generating a prompt to execute a user intervention action prior to a third autonomous training session succeeding the second autonomous training session; and
  transmitting the prompt to the user.

20. The method of claim 14, wherein tracking the anxiety level of the animal during the first autonomous training session comprises, in response to dispensing a first unit of the primary reinforcer into the working field:
 tracking a duration between dispensation of the first unit of the primary reinforcer and consumption of the first unit of the primary reinforcer; and
 characterizing an anxiety level of the animal based on the duration.

\* \* \* \* \*